W. A. EGGERS AND T. DAVIS.
ART OF MAKING HOLLOW RUBBER ARTICLES.
APPLICATION FILED MAR. 12, 1921.
1,400,146.
Patented Dec. 13, 1921.
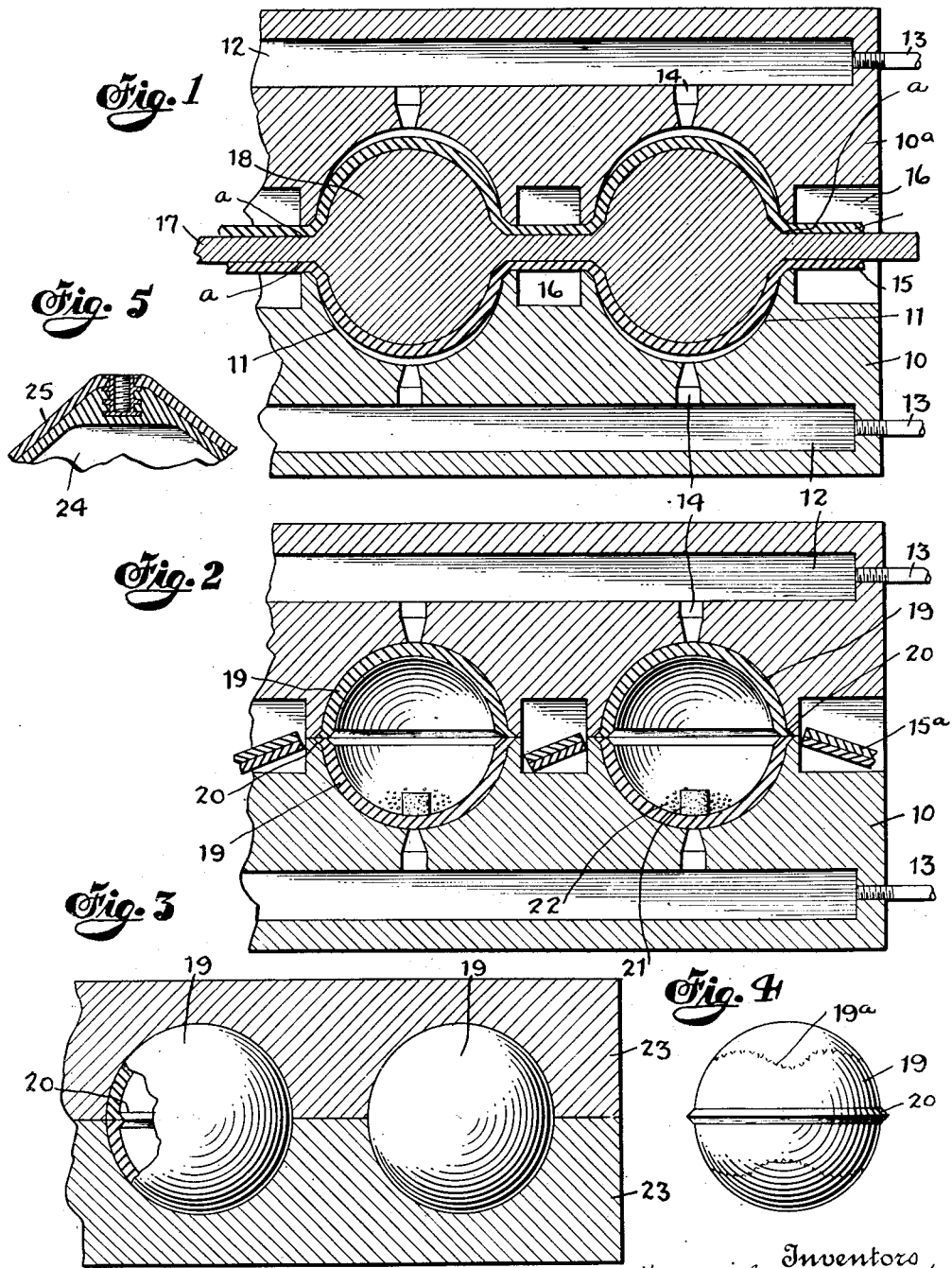
Inventors
Walter A. Eggers and
Theron Davis
By their Attorney
W. B. Hutchinson.

UNITED STATES PATENT OFFICE.

WALTER A. EGGERS, OF BROOKLYN, AND THERON DAVIS, OF NEW YORK, N. Y.; SAID EGGERS ASSIGNOR TO SAID DAVIS.

ART OF MAKING HOLLOW RUBBER ARTICLES.

1,400,146.  Specification of Letters Patent.  Patented Dec. 13, 1921.

Application filed March 12, 1921. Serial No. 451,669.

*To all whom it may concern:*

Be it known that we, WALTER A. EGGERS, a citizen of the United States, residing in the borough of Brooklyn, city and State of New York, and THERON DAVIS, a citizen of the United States, residing in the city, county, and State of New York, have invented new and useful Improvements in the Art of Making Hollow Rubber Articles, of which the following is a full, clear, and exact description.

Our invention relates to the improvement in the art of making hollow rubber articles such as balls, tank balls, bulbs and analogous things and the general object of our invention is to produce such articles more cheaply and better than they have been produced heretofore. More particularly our invention is intended to provide means for shaping the articles from the raw stock so that they will be held firmly in the molds in their separate form and then united in such a way as to prevent any distortion of such articles or parts and also in such a manner as to insure their better union at their meeting points.

Our invention is also intended to provide means for shaping the desired articles from the raw rubber in sheet form and to give the desired shape to the stock and trim the formed articles while the rubber is in the raw state so that the trimmings are more valuable than in the usual process of trimming the articles after they are vulcanized, as the raw stock is worth more for use than the vulcanized trimmings.

In carrying out our process we provide means for shaping the articles either singly or in multiple, from the sheet stock and provide a vacuum or suction process by which after the articles are formed they are held firmly in their respective mold sockets in such a way that they are not disturbed until the meeting parts of opposed portions of the articles are firmly united. The formed parts of the article in process can then be held while the forming core is removed and the parts united, thus providing means for cleaning the edges to be united by a solvent, if desired, and holding the parts in such shape that a firm, true union results when they are brought together in the mold.

Other advantages of our invention will appear from the description which follows.

Reference is to be had to the accompanying drawings which illustrate how our improved method can be carried out and in which similar characters refer to similar parts throughout the several views.

Figure 1 is a sectional elevation showing the sheets of stock in the mold, with a forming core between the sheets and just before the material is fully seated in the mold sockets.

Fig. 2 is a view similar to Fig. 1, excepting that the forming core is removed and the mold parts are brought together in such a way as to complete the formation of the articles and sever the trimmings.

Fig. 3 is a broken sectional view showing the articles after they are transferred from the forming to the vulcanizing mold.

Fig. 4 is a detail showing the appearance of a ball formed according to our process and before it is transferred to the vulcanizing mold; and Fig. 5 is a detail sectional view of a part of a tank ball.

The drawings are by way of example and show means for carrying our improved method into effect, but from the description which follows it will be understood that the method is not limited to any particular form of apparatus.

In Figs. 1 and 2, we have shown separate mold parts 10 and 10ª which can be moved back and forth or up and down with reference to each other by any usual or preferred means and these are provided with mold sockets 11 which correspond approximately with one half of the article to be formed. In the present instance the mold is shown adapted for forming rubber balls and consequently the sockets 11 are essentially semispherical and the socket in one mold comes directly opposite the corresponding socket of the opposite mold.

To hold the rubber stock or rubber sheet in place in each socket, we provide a vacuum or suction system which can be done in any convenient way but we have shown each mold section or member provided with a vacuum chamber 12, which is exhausted or practically exhausted through the pipe 13 and the chamber connects by means of ducts 14 with the backs of the several mold sockets. In this connection it will be understood that there may be any desired number of these sockets.

The articles to be formed are made from sheet rubber stock 15, these sheets being unvulcanized, and the molds are provided with channels or recesses 16, adjacent to the sockets 11, for the purpose of receiving the stock trimmings 15ª when the balls or similar articles are formed as presently described.

When the articles are to be formed the mold members 10 and 10ª are separated and a sheet of stock 15 laid upon the lower member, and the core piece 17 having members 18 of the form of the articles to be shaped and of a size corresponding to the interior of such articles, is laid upon the sheet so that the members 18 will come opposite the lower sockets 11. A second sheet of rubber 15 is laid across the top of the core pieces and the members 10 and 10ª are then brought together thus forcing the sheets of rubber into the several sockets 11 of both mold members 10 and 10ª, and suction or vacuum is then provided by the means above referred to so that the parts of the stock forced into the sockets 11 are held there securely. The molds are then separated and the core piece removed. It will be seen therefore that the stock is shaped by the core pieces which constitute the male members of the mold, in the sockets 11 and that the vacuum or partial vacuum has nothing to do with the formation of the articles but holds the shaped parts in position so that they do not shift while the core piece is being removed and the process further proceeded with. This is an improved step as it prevents shifting of the stock and distortion of the parts and the making of imperfect articles.

After the core piece 17 is removed the sheets of stock at the point marked $a$ which are to come together during the further steps of the process can be cleansed and preferably with a rubber solvent such as benzin or the like so that when subsequently brought together under pressure they will closely adhere at the meeting point.

Before the mold members are brought together to form the balls 19 one member of the ball can be provided with the customary rubber block 21 to provide for proper inflation of the ball after vulcanizing. This step need not be referred to in detail because it is customary in the manufacture of hollow rubber articles.

While the molds are separated some ammonium chlorate or other suitable material can be placed in the several lower members of the balls 19 so that when the balls are transferred to the vulcanizing mold and subjected to heat, gaseous material will be produced which will force the stock of the balls firmly against the backs of the mold sockets in the vulcanizing mold. This step also is the common practice and is not claimed by us.

After the core piece has been removed and the gas or steam making material has been inserted in the several articles as described the molds are brought together under pressure and the parts referred to at the portion marked $a$ will closely adhere. This is caused not only by the pressure but because of the fact that the molds are warm and the stock absorbs the heat from the molds so as to put it in the right temperature for making a good union. As this pressure is applied and a union effected as stated the edges of the mold members around the sockets 11 severs the stock around the several balls or other articles under process leaving a bead 20 and the trimmings 15ª fall away as described.

The formation of the balls now having been completed they are transferred through the vulcanizing mold as shown in Fig. 3 for completion. This mold can be of any kind suitable for the purpose comprising separable members 23 with opposite semi-spherical sockets to receive the ball and in this mold the balls are subjected to suitable heat to vulcanize them.

Before the balls are placed in the vulcanizing mold they are on opposite ends and while soft, indented as shown at 19ª at points generally 45 degrees from the bead 20 as shown by dotted line and as the material is unvulcanized and there is no appreciable pressure the indentations persist until the balls are in the vulcanizing molds. This indentation of the parts at the points indicated has a tendency to draw in the bead 20 or in other words the point of union of the two ball members so that the bead readily slips into the socket of the mold. As the ball becomes harder in the vulcanizing mold gas or steam according to the materials in the ball will be generated so as to exert internal pressure against the wall of the ball and this pressure will first act to force out the indented parts 19ª and thus no appreciable strain will be applied to the meeting points of the two half members of the ball until vulcanization begins, and as a consequence the union will be firm. This is an important step because otherwise there would be considerable strain upon the meeting parts of the ball and as they have not become firmly set separation or partial separation might follow and an imperfect ball result. As vulcanization proceeds the internal pressure holds all parts of the ball against the surrounding parts of the mold, the bead disappears, the surplus material merging in the adjacent parts of the ball. This same result would be attained if the article under process had irregular surfaces other than the bead mentioned.

In the foregoing description we have referred chiefly to the manufacture of balls as this is a subject capable of easy illustration but it will of course be understood that the process can be applied to the making of any hollow article, and it is evident that the mold sockets would be shaped to correspond with the desired shape of the article and that the core piece would likewise be made of such shape. In consonance with this idea we have shown in Fig. 5 a section of a tank ball simply to illustrate that such things might be made by our process. This ball according to general practice has an insert 24 in the upper part which becomes harder when vulcanized than the outer member 25 so that when forming an article of this sort the outer member 25 is shaped by our process as above described and the insert is made in the upper member before the two parts of the member 25 are united and both inner and outer members can be vulcanized together in the vulcanizing mold. This will bring out the fact that our process can be utilized in forming articles which have inserts or attached members of a different composition so as to be vulcanized to a greater or less extent as desired. It will be understood also that this insert or attached part need not be of rubber and reference to this fact is made only to make it clear that our process can be used in forming hollow rubber articles having various materials inserted or attached thereto or connected therewith. It will be understood that where rubber inserts are used the meeting points of the insert and its container would be treated in such a way as to cause the parts to adhere firmly when vulcanized.

We claim:

1. The improvement in the art of making hollow rubber articles, which consists in shaping the article from unvulcanized stock in sheet form by the use of mold and core members, removing the core, retaining the shaped parts in the mold sockets by suction after the removal of the core, moistening with a rubber solvent or cement the edges of the formed parts at the surfaces to be united, uniting the edges and trimming the formed articles by pressure of the mold members, and then vulcanizing the formed articles in a separate mold.

2. The improvement in the art of making hollow rubber articles, which consists in shaping the desired article from unvulcanized stock in a mold, holding the shaped material in the mold by suction which is maintained after the removal of the forming parts and until the opposed members of the shaped article are united, and then uniting the members of the article by pressure.

3. The improvement in the art of making hollow rubber articles which consists in molding unvulcanized rubber to the desired shape and in separate parts, holding the shaped members in their mold by suction, which is maintained after the removal of the forming devices and until the opposed parts are united, uniting the parts under pressure and trimming the united parts before vulcanization.

4. The improvement in the art of making hollow rubber articles which consists in molding the article in opposed parts and from unvulcanized stock, holding the formed parts of the article in their molds by suction, which is maintained after the removal of the forming devices and until the shaped parts are united, uniting and trimming the meeting portions of the part under pressure, and then vulcanizing the so united parts of the article.

5. The improvement in the art of making hollow rubber articles which consists in shaping the articles from unvulcanized stock and in separate parts over a core piece, holding the shaped parts in their position in the molds by suction, which is maintained after the removal of the core piece, then removing the core piece, then uniting the shaped parts under pressure, trimming them and finally vulcanizing the formed article.

6. The improvement in the art of making hollow rubber articles in multiple, which consists in providing opposite mold members with sockets shaped to form parts of the desired articles, placing a sheet of unvulcanized stock over one of the mold parts, next placing in position on said sheet the core piece with members shaped to fit the sockets of the mold, next placing the sheet of raw stock between the core and the second member of the mold, then shaping the article over the core piece under pressure, next applying suction to the backs of the shaped articles to hold them in position, and maintaining the suction after the removal of the core piece and until the opposed parts are united, then removing the core piece, next bringing the mold members together to unite the formed article and trim the article thus formed, and finally vulcanizing the formed article.

7. The improvement in the art of making hollow rubber articles which consists in shaping the article in two pieces in a suitable mold and from unvulcanized stock, placing within the article a material adaptable to forming an expansible fluid or gas when heated, uniting the parts of said article under pressure, indenting the article at points removed from the junction of the parts so as to draw in the parts at the point of union, and finally placing the formed parts in a vulcanizing mold and vulcanizing the formed article.

WALTER A. EGGERS.
THERON DAVIS.

Witnesses:
JAY EMANUEL,
M. G. O'DONNELL.